(No Model.) 10 Sheets—Sheet 2.
J. MARHOEFFER.
QUILTING MACHINE.

No. 369,255. Patented Aug. 30, 1887.

Fig. 2.

Witnesses:
Inventor:
John Marhoeffer
by Gopeck Raegener
Attorneys.

(No Model.)  10 Sheets—Sheet 4.

J. MARHOEFFER.
QUILTING MACHINE.

No. 369,255.  Patented Aug. 30, 1887.

(No Model.) 10 Sheets—Sheet 8.

J. MARHOEFFER.
QUILTING MACHINE.

No. 369,255. Patented Aug. 30, 1887.

Witnesses:
Inventor:
John Marhoeffer (No Model.) 10 Sheets—Sheet 9.

J. MARHOEFFER.
QUILTING MACHINE.

No. 369,255. Patented Aug. 30, 1887.

Witnesses:
Otto Beyer
Martin Petry

Inventor:
John Marhoeffer
by
Goepel & Raegener
Attorneys.

(No Model.)  
10 Sheets—Sheet 10.

J. MARHOEFFER.
QUILTING MACHINE.

No. 369,255. Patented Aug. 30, 1887.

Witnesses:  
Otto Beyer  
Martin Petry

Inventor:  
John Marhoeffer  
by Goepel & Raegener  
Attorneys.

UNITED STATES PATENT OFFICE.

JOHN MARHOEFFER, OF NEW YORK, N. Y., ASSIGNOR TO HIMSELF, JOHN H. BIERWIRTH, AND FREDERICK SCHNERRING, OF SAME PLACE.

QUILTING-MACHINE.

SPECIFICATION forming part of Letters Patent No. 369,255, dated August 30, 1887.

Application filed April 29, 1886. Serial No. 200,610. (No model.)

*To all whom it may concern:*

Be it known that I, JOHN MARHOEFFER, of the city, county, and State of New York, have invented certain new and useful Improvements in Quilting-Machines, of which the following is a specification.

This invention relates to certain new and useful improvements in that class of machines used for quilting or sewing a number of layers of fabric, or fabric and cotton batting, together, said machines being provided with a number of needles working at the same time.

The object of my invention is to simplify the construction of the machine and facilitate the adjustment of the parts as required by the size, shrinkage, &c., of the fabric.

The invention consists in the combination, with a reciprocating needle carrier and shuttle guide and carrier, of a cam for operating said parts and shuttle-carrier, an automatic feed mechanism, &c., and in the construction and numerous combinations of parts and details, as will be fully described and set forth hereinafter, and pointed out in the claims.

In the accompanying drawings.

Similar letters of reference indicate corresponding parts.

The entire working parts of the machine are supported by the frame A, which has suitable legs. In brackets of the frame a driving-shaft, A', is journaled, provided with a belt-pulley, A², and from said shaft the other parts of the machine are operated.

On one end of the shaft A' a disk or wheel, B, is mounted, which is provided with a wrist-pin connected by a connecting-rod, B', with an arm, B², on one end of a rock-shaft, B³, journaled in suitable bearings in the bottom of the frame A, said rock-shaft being provided at each end with an arm, B⁴, connected by the connecting-rods C with the vertically-sliding sleeves C', mounted on the standards C², of which one is provided at each end of the machine. Said sleeves C' are each provided on the rear side with a pocket, C³, closed by a suitable plate, and through said pockets C³ the needle-carrier D is passed to slide in the direction of its length and in the horizontal plane.

On one end of the bar D the downwardly-projecting arm D' is fastened, which is mounted to slide vertically in a guide-groove of a standard, D², formed on the end of the flat bar D³, which is mounted to reciprocate horizontally in the direction of its length, and is provided at its front edge with a pin and roller, D⁴, which latter is passed into a cam-groove, D⁵, in the rim of a cam-pulley, D⁶, mounted on the pivot E, projecting from the side of the frame A, said pulley D⁶ being made integral or firmly connected with a cog-wheel, E', of the same diameter, with the teeth of which cog-wheel the dog E² can engage, pivoted on the upper edge of the rocking lever E³, provided on its lower end with a roller, E⁴, resting on the rim of the cam-wheel E⁵, mounted rigidly on one end of the shaft E⁶, journaled in suitable brackets in the front part of the frame A, and provided at the opposite end with an arm, E⁷, connected by a connecting-bar, E⁸, with the side of the cam-wheel $A^3$, mounted rigidly on that end of the shaft $A'$ opposite the one on which the wheel or disk B is mounted, whereby the shaft $E^6$ is rocked from the main driving-shaft $A'$. Springs are provided for pressing the roller $E^4$ against the rim of the cam $E^5$ and pressing the dog $E^2$ on the rim of the cog-wheel $E'$. A locking-pawl, $E^3$, engaged with the rim of the cog-wheel $E'$, is pivoted above the rim of said wheel and serves to prevent the return movement of the wheel, and also to prevent said wheel from being moved forward more than one tooth.

The needle-carrier D is provided in its face with a longitudinal groove, F, above which the rib $F'$ projects from the face of the needle-carrier, which rib is held on the needle-carrier by means of suitable angle-irons or other suitable fastening devices. In the bottom of the groove F notches or recesses $F^2$ are formed at suitable intervals, through which the needles G can pass. The upper end of each needle is held in a needle-holder formed of a plate, $G'$, provided with a longitudinal slot, $G^2$, through which a screw, $G^3$, is passed and screwed into an aperture in the needle-carrier D, said screw serving to hold the needle-holder in place and prevent it from shifting in the direction of the length of the groove F.

On the plate $G'$ a clamp, $G^5$, is held by a screw, $G^4$, passed through said plate $G^5$ and screwed into an aperture of the plate $G'$, the said plates $G'$ and $G^5$ being provided in their adjacent faces with grooves for receiving the upper end of the needle. As the plate $G'$ is provided with a slot, $G^2$, the needle-clamping device can be shifted in the groove F in the direction of the length of the needle-carrier, and can then be locked in place by means of the screw $G^3$, the screw $G^4$ serving only to clamp the needle.

Figure 1:
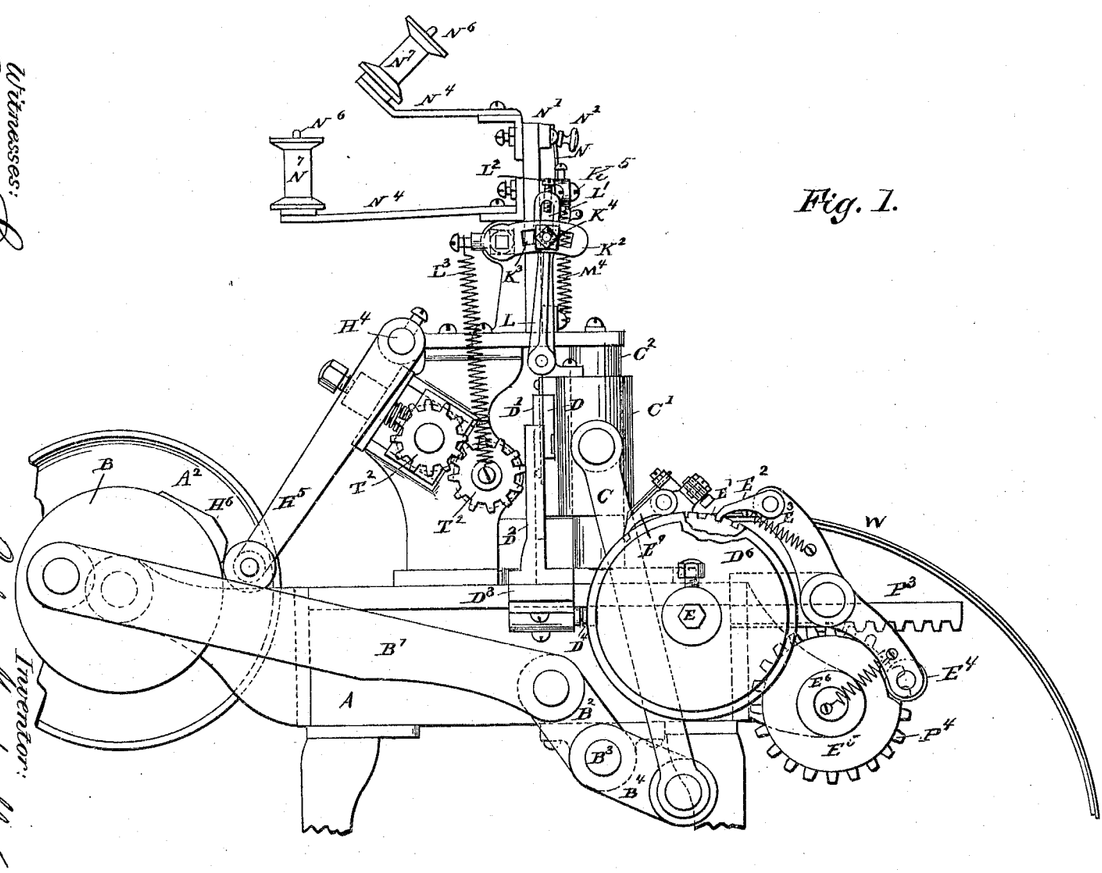
Figure 1 is an end view of the working parts of my improved quilting-machine, parts being broken out.
Figure 2:
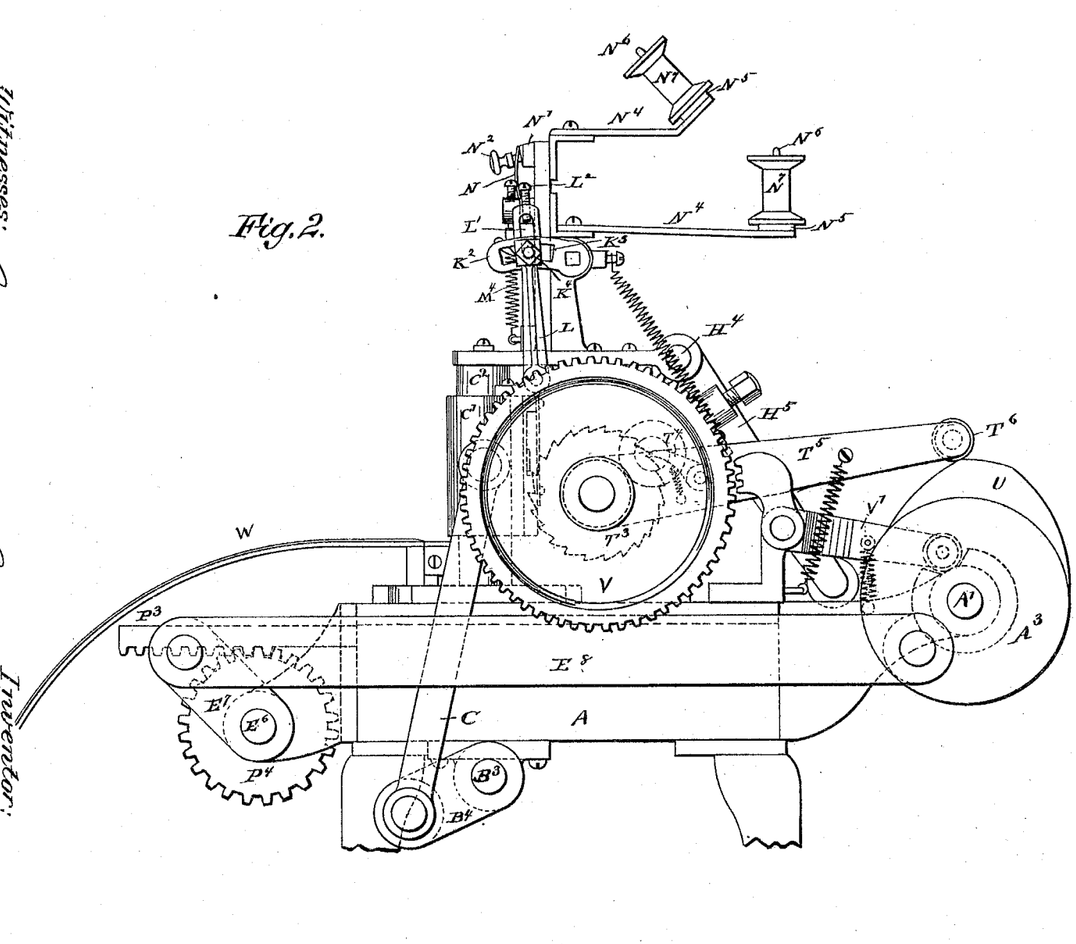
Fig. 2 is a view of the opposite end, parts being broken out.
Figure 3:
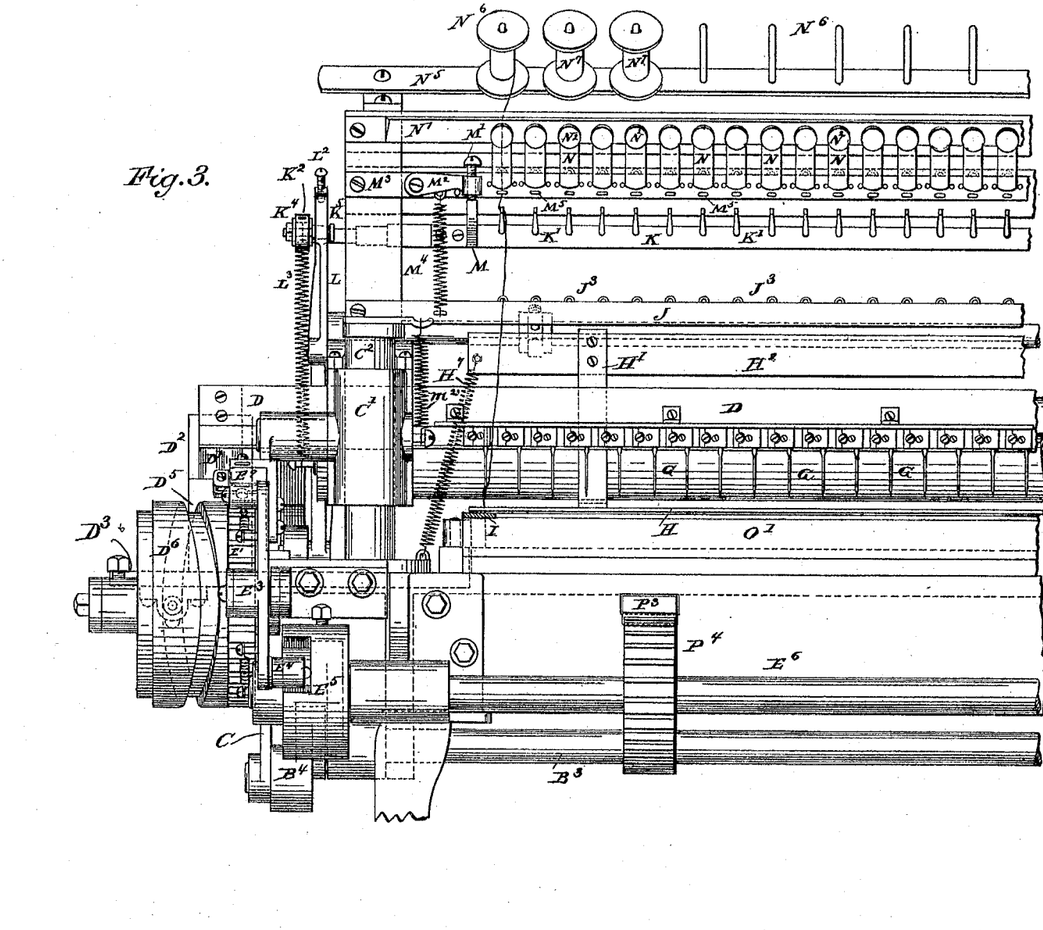
Fig. 3 is a front view of those parts of the machine shown in Fig. 1, parts being broken out.
Figure 4:
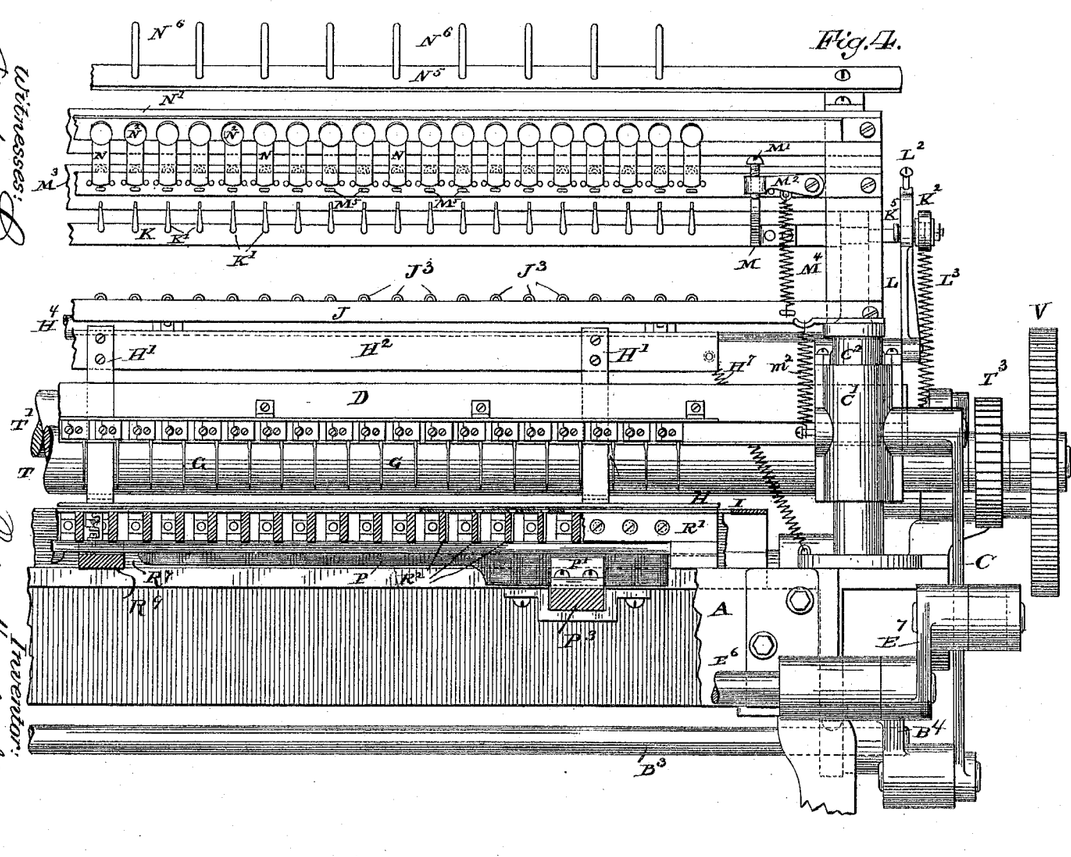
Fig. 4 is a front view of those parts of the machine shown in Fig. 2, parts being broken out and others in section.
Figure 5:
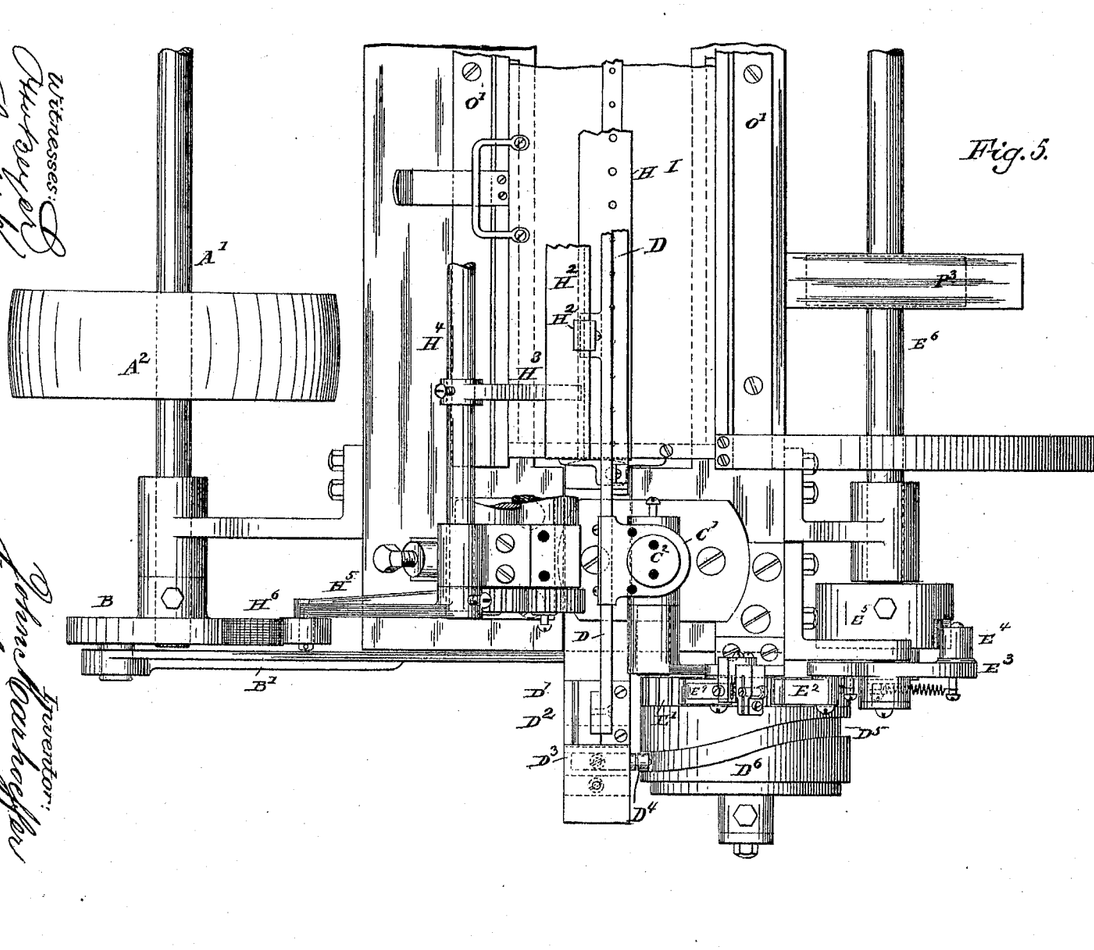
Fig. 5 is a plan view of those parts of the machine shown in Fig. 1, parts being broken out and others in section.
Figure 6:
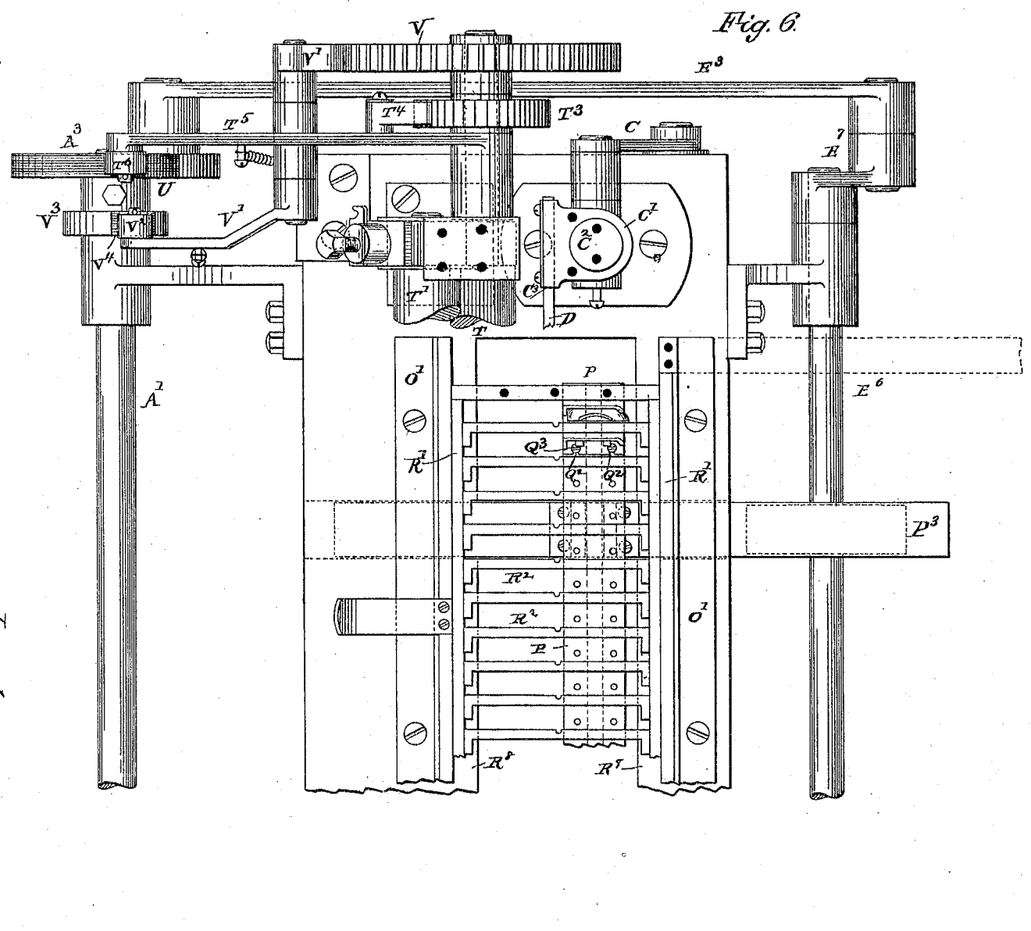
Fig. 6 is a plan view of those parts of the machine shown in Fig. 2.
Figure 7:
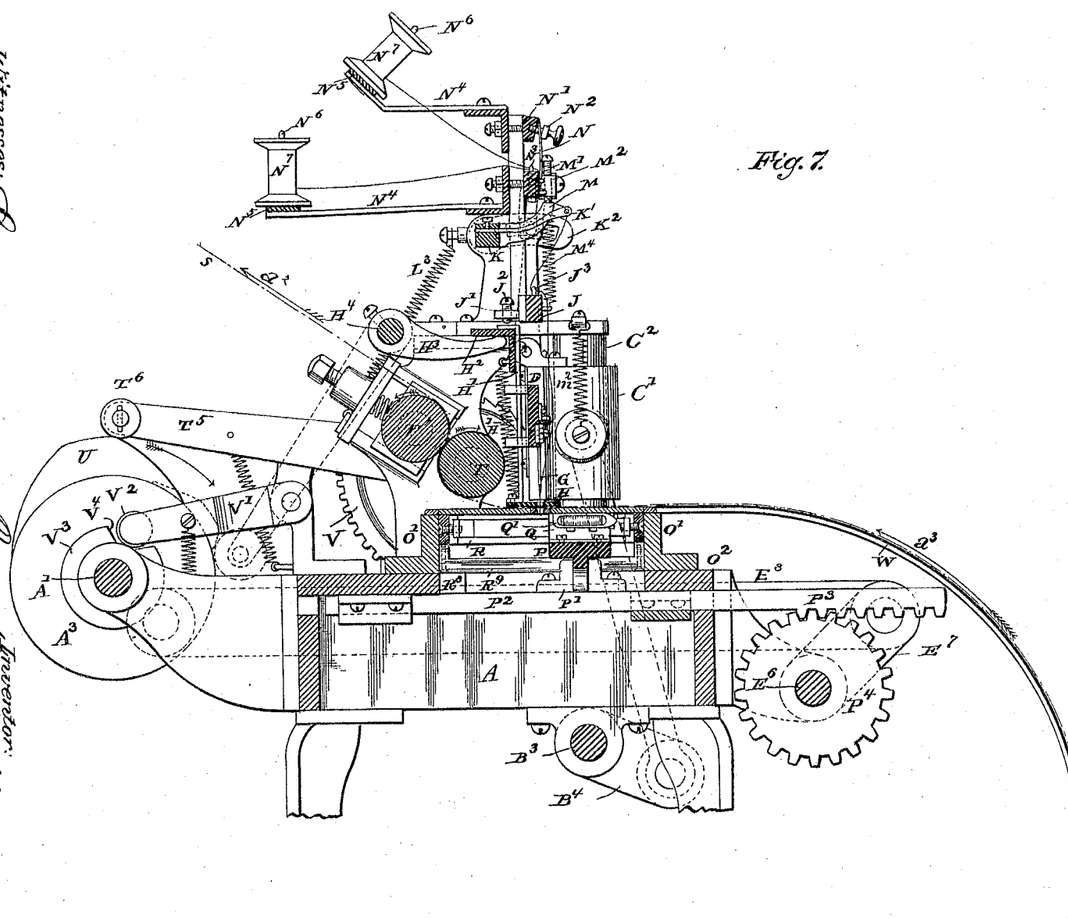
Fig. 7 is a cross-sectional view of the machine.
Figure 8:
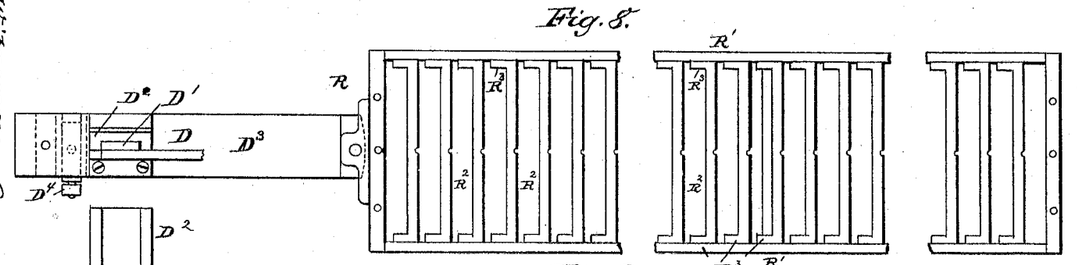
Fig. 8 is a plan view of the shuttle-guide, parts being broken out.
Figure 9:
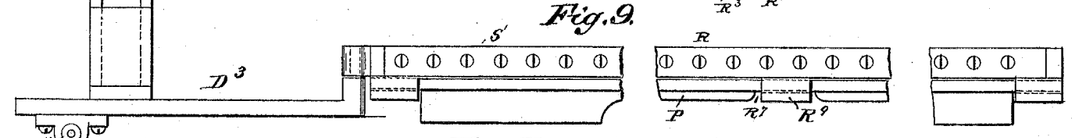
Fig. 9 is a front view of the same, parts being broken out.

The presser-foot H, provided with slots for the needles, is secured to the lower ends of bars $H'$, passed through guide-lugs on the back of the needle-carrier, and having their upper ends bent over and fastened on the angle-bar $H^2$, parallel with and above the needle-carrier, which angle-bar $H^2$ rests on cam-arms $H^3$ of a rock-shaft, $H^4$, provided at one end with an arm, $H^5$, provided on its lower swinging end with a roller, on which the cam projection $H^6$ on the rim of the wheel B can act. Springs $H^7$ are fastened to the bar $H^2$ and to parts of the frame of the machine and press the foot down upon the bed or throat plate I. From the upper part of a bar, J, fixed on the frame slightly above and in front of the angle-iron $H^2$, lugs $J'$ project, in which check-screws $J^2$ are held, against which check-screws the angle-iron $H^2$ strikes when it is raised, thus preventing it from being raised too high, Fig. 7. From the upper edge of the bar J the thread-guides $J^3$ project, which consist of loops or rings. Above the bar J a rocking shaft, K, is mounted parallel with the bar J, and from said rocking shaft K take-up arms $K'$ project, provided at their outer ends with eyes, through which the threads are passed. On each end of the rock-shaft K an arm, $K^2$, is fixed, having a segmental slot, $K^3$. In each slot $K^3$ a block, $K^4$, is held adjustably, and from the same a pin, $K^5$, projects through a slot, $L'$, in the upper end of an arm, L, pivoted on the top of the corresponding sleeve, $C'$. A set-screw, $L^2$, is held in the upper end of the arm L and projects down into the slot $L'$ from the upper end of the same. As the arm L swings downward, the inner end of the pin $L^2$ strikes the pin $K^5$ and swings the arm $K^2$ downward. When the connecting-bar L moves upward, the arm $K^2$ is swung upward by the spiral springs $L^3$, secured to pins projecting from the inner end of the arms $K^2$ and having their lower ends fastened on part of the machine-frame. An arm, $K^2$, and the parts connected therewith are provided on each end of the rock-shaft K.

The rock-shaft K is provided at each end with an arm, M, projecting toward the front, the outer end of which arm can rest against or strike a screw, $M'$, held in the end of a lever, $M^2$, pivoted on the front of a bar, $M^3$, fastened on the frame of the machine above and in front of the rock-shaft. The levers $M^2$ are pulled downward by the springs $M^4$, secured to said levers and to the bar J. A lever $M^2$ and parts connected thereto and an arm M are provided at each end of the rock-shaft K and bar $M^3$. On the front of bar $M^3$ thread-guides $M^5$ are fastened, and above the same the lower ends of the spring-strips N rest on the front of the bar $M^3$, the upper ends of the tension-springs N being fastened on the bar $N'$, each spring N being provided with a screw, $N^2$, for adjusting its tension. On the top edge of the bar $M^3$ the thread-guides $N^3$ are fastened.

From the frame of the machine the arms $N^4$ project, carrying the bars $N^5$ parallel with the needle-carrier, said bars $N^5$ carrying the pins $N^6$, on which the spools $N^7$ are mounted loosely. The spools are arranged in two rows to permit arranging a greater number of spools in available space.

The bed or throat plate I of the machine is fastened on the top of the shuttle-guide R, which guide is mounted to slide parallel with the needle-carrier between the guides $O'$ on the top plate, $O^2$, of the frame of the machine, said shuttle-guide being connected with the bar $D^3$.

Below the shuttle-guide the T-shaped bar P is mounted to slide in the direction of its length and parallel with the needle-carrier between the guide-lugs $p'$ projecting upward, the bars $P^2$ being mounted to slide below the plate $O^2$ at right angles to the T-shaped bar P, said bars $P^2$ having racks $P^3$ formed at their outer projecting ends on their bottom edges, which racks engage the cog-wheels $P^4$, mounted on the shaft $E^6$, the connections for which were previously described, and which is the same shaft which carries the cam-wheel $D^6$. The bar P can thus reciprocate in the direction of its length and can be moved by the bars $P^2$ in a direction at right angles to its length.

On the bar P the shuttle-holders Q are fastened, which carry and hold the shuttles Q', which are of the usual construction, and which each contain a bobbin, also of the usual construction.

The several shuttle-holders Q on the bar P project upward into the compartments formed in the shuttle-guide R. The bases of the shuttle-holders are provided with the slots $Q^2$, extending transversely to the longitudinal axis of the shuttle-holders, through which slots $Q^2$ the screws $Q^3$ are passed into the upper surface of the bar P. This construction permits of adjusting the shuttle-holders on the bar P.

Figure 10:
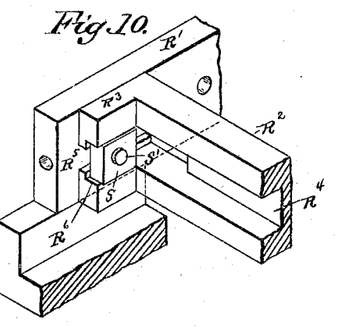
Fig. 10 is a detail perspective view of a part of the shuttle-guide, parts being broken out and others in section.
Figures 11, 12:
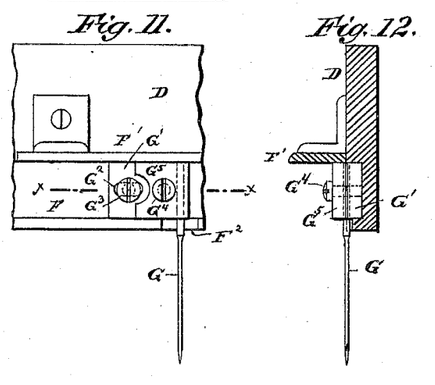
Fig. 11 is a front view of part of the needle-carrier.
Fig. 12 is a cross-sectional view of the same.
Figure 13:
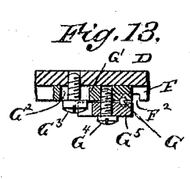
Fig. 13 is a sectional plan view of part of the same on the line $x\,x$, Fig. 11.
Figure 14:
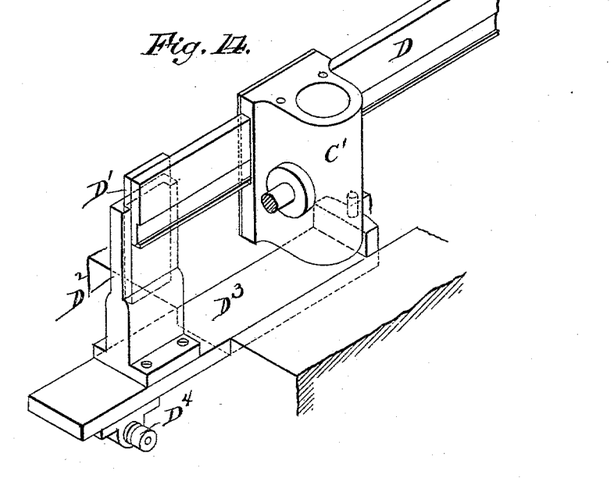
Fig. 14 is a detail perspective view of the end parts of the needle-carrier and shuttle-guide.
Figure 15:
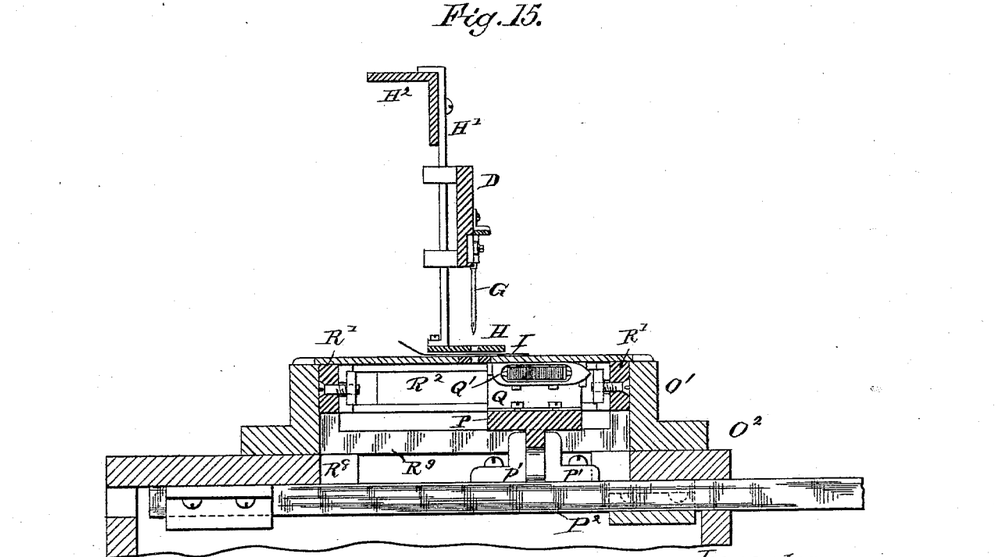
Fig. 15 is an enlarged cross-sectional view of the needle-carrier, shuttle, and guide, &c.
Figure 16:
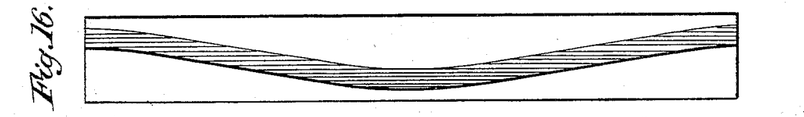
Fig. 16 is an end view of one of the cams unrolled.

The shuttle-guide R consists of the side bars, R', and the cross-bars $R^2$, having their ends bent over at right angles, so as to be approximately U-shaped, said bent ends resting against the inner sides of the bars R'. The cross-bars $R^2$ are provided with the slots $R^4$ (see Fig. 10) in the sides and the slits $R^5$ and grooves $R^6$ in the ends. In the said end grooves, $R^6$, of each cross-piece $R^2$ a nut, S, is held, which is screwed on a screw, S', in a side piece, R'. The screw can be loosened from the outside, and then the cross-pieces $R^2$ can be shifted in the direction of the longitudinal axis of the shuttle-guide, and then locked in place by turning up the screw. The cross-pieces $R^2$ of the shuttle-guide can thus be adjusted on the side pieces, and thus the said cross-pieces $R^2$ can be adjusted to the positions of the shuttle-holders.

The side bars, R', of the shuttle-guide rest upon cross-pieces $R^9$, passed under the bar P and through notches $R^7$ in the bottom edge of the same, said cross-pieces $R^9$ resting on the tracks $R^8$ of the bed-plate of the machine.

The feed-rollers T T' are mounted to revolve on their longitudinal axis behind the needle-carrier, the roller T' being journaled in movable boxes, which can be controlled by a screw and spring in the usual manner. At their ends the feed-rollers are provided with the cog-wheels $T^2$, engaging with each other, and on end of the shaft of the roller T the ratchet-wheel $T^3$ is mounted, with which the dog $T^4$ engages, pivoted on a lever, $T^5$, carrying on its free end a roller, $T^6$, which travels on the cam U, formed on the edge of the pulley $A^3$.

A cog-wheel, V, is mounted on the end of the shaft of the roller T adjacent to the ratchet-wheel $T^3$, and with the teeth of the cog-wheel V the toothed end of an angle-lever, V', can engage, which carries on its end a roller, $V^2$, running on a cam, $V^3$, mounted on the shaft A' and having a notch, $V^4$. A curved guard-plate, W, projects downward and toward the front from the sewing-plate I and covers the gearing for moving the shuttle-guide.

On the upper end of each standard $C^2$ a spring, $m^2$, is fastened, the lower ends of which are connected with the sliding sleeve C' for pulling the same upward.

The operation is as follows: The rock-shaft $B^3$ is operated from the pulley B by means of the connecting-rod B', and from said rock-shaft the sleeves C' are reciprocated vertically by means of the connecting-links C. The needle-carrier D, which is mounted to slide horizontally in the sleeves C', is thus reciprocated vertically with said sleeves. The vertical end pieces, D', on the ends of the needle-carrier D slide vertically in the grooved vertical guides or standards $D^2$ of the bar $D^3$, which bar $D^3$ is reciprocated by the action of the sides of the cam-groove $D^5$ in the pulley $D^6$ on the roller $D^4$ of the bar $D^3$. The pulley $D^6$ is rotated at regular intervals by the action of the pawl $E^2$ on the teeth of the ratchet-wheel E', connected with the said pulley $D^6$, said pawl $E^2$ being operated by the rocking lever $E^3$, which in turn is operated by the pulley $E^5$ on the rocking shaft $E^6$. As the racks $P^3$ are engaged with the cog-wheels $P^4$ on the rock-shaft $E^6$, said cog-wheels are rocked with the shaft, whereby a horizontal reciprocating motion is given to the racks $P^3$ in a direction at right angles to the horizontally-reciprocating motion of the needle-carrier. As the bar P, supported by racks, is between the lugs P' on the racks $P^3$, said bar P is also reciprocated in a horizontal plane in a direction at right angles to the horizontal reciprocating movement of the needle-carrier. The shuttle-holders Q, which are located in the subdivisions of the shuttle-guide R, are fastened on the bar P, and are thus reciprocated with the bar P horizontally at right angles to the direction of reciprocation of the needle-carrier. The shuttle-guide R, resting on the cross-pieces $R^9$ on the base of the machine, is adapted to reciprocate on the same horizontally in a direction parallel with that of the needle-carrier, and is reciprocated in said direction by the action of the cam-groove $D^5$ in the pulley $D^6$ on the roller $D^4$, which is held on a projection of the bar $D^3$, with which the shuttle-guide is connected, as stated. The shuttle-holders are thus reciprocated on a horizontal plane at right angles to the direction of the needle by the action of the pulley on the rock-shaft $E^6$. The shuttle-holders in which the shuttles are held are thus reciprocated horizontally at right angles to the needle-carrier, and also parallel with the needle-carrier. The reciprocations in the direction at right angles to the needle-carrier take place very frequently and rapidly—that is, once in each direction for each stitch—whereas the reciprocations in the direction parallel with the needle-carrier take place at greater intervals and are governed by the shape of the cam-groove $D^5$ in the pulley $D^6$. The parts are so adjusted that one reciprocation of the shuttle-carriers in a direction at right angles to the needle-carrier takes place for each vertical stroke of the sleeves C'. The needle-carrier is reciprocated in a horizontal plane from the bar D³, connected with the shuttle-guide, and the vertical end pieces, D', are mounted to slide in the upright guides D² of the bar D³, which sliding movement is necessary, as the needle-carrier is reciprocated vertically at the same time that it is reciprocated in a horizontal plane. Whenever the needles are raised and the cloth is to be fed forward by the feed mechanism, the operation of which will be described hereinafter, the presser-foot H is raised, which is accomplished by the arms H³ on a rock-shaft, H⁴, provided with the arm H⁵, which in turn is operated by the cam H⁶ on the pulley B. The take-up arms K', through which the threads are passed, are fixed in the rocking shaft K, which is operated by the connecting-bars L from the vertically-sliding sleeve C'. The distance that the take-up arms travel can be regulated by adjusting the blocks in the slots K³ of the arms K² a greater or less distance from the shaft K. The springs M⁴ serve to counterbalance the presser-foot. The levers M² are swung up immediately after the stitches are locked, and thus give slack thread to permit the needle-carrier and shuttle-guide to be moved longitudinally, both of these members beginning to move in the direction of their length as soon as the levers M² start, whereby all side pull on the fabric is prevented. The feed-rollers are operated by the action of the pawl T⁴ of the arm T⁵ on the ratchet-wheel T³, which arm T⁵ is operated by the cam V² on the pulley A³. The wheel V on the same feed-roller with the ratchet-wheel T³ is locked in place during the time that the pawl T⁴ does not operate on the ratchet-wheel, which is operated by the cam V³ acting on the roller on the outer end of the arm V⁷, the toothed end of the cam engaging with the teeth of the cog-wheel V. The cloth or fabric is moved through the machine in the direction of the arrows $a^2 a^3$, Fig. 7, and is represented by the letter s, Fig. 7, and passes over the guide, as indicated by the arrows $a^3$, Fig. 7.

Figure 17:
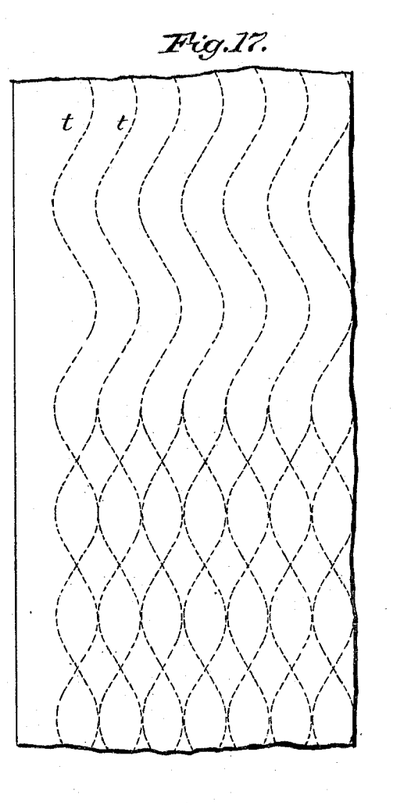
Fig. 17 is a face view of the fabric produced on my quilting-machine by means of said cam.
Figure 18:
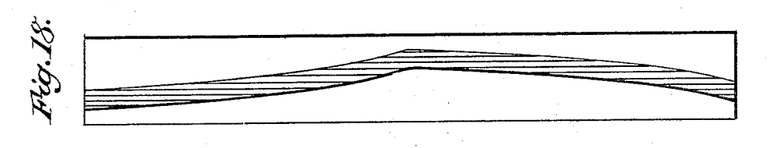
Fig. 18 is an end view of another cam unrolled.
Figure 19:
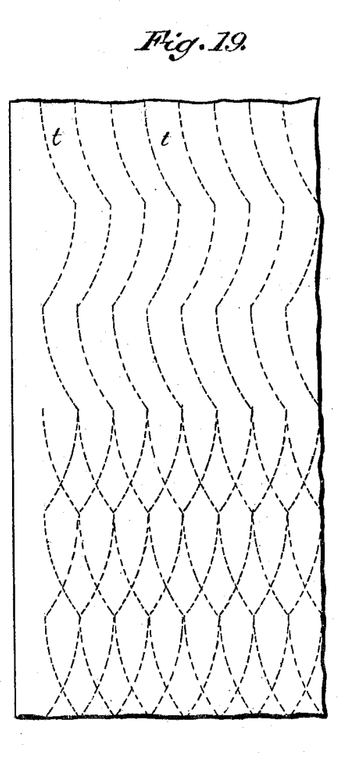
Fig. 19 is a face view of part of the fabric produced on my machine by means of the said cam.

During the passage of the fabric through the machine a row of stitches, t, is formed, as shown in Figs. 17 and 19, the formation of these stitches being governed by the shape of the cam-groove D⁵ in the pulley D⁶, as said cam-groove shifts the needle-carrier and shuttle-guide in a horizontal plane gradually. After the fabric has passed entirely through the machine the fabric is passed through again, but is so adjusted that the second row of stitches crosses the first row, thus producing the design shown in Figs. 17 and 19, the same cam being used for both rows, with the exception that the cloth is adjusted so that where the convex curves in one row of stitches are the concave stitches are in the second row.

As it is desirable to make the rows of stitches different from each other, the needles, shuttle-holders, and the cross-bars of the shuttle-guide must be made adjustable. This is also necessary, as the needles must be adjusted closer together while making the second rows of stitches than when making the first, as the cloth shrinks more or less during the time that the first row of stitches is being made.

The plates G', in which the needles are held, can be shifted after the screws G³ have been loosened. The cross-bars R' of the shuttle-guide can be adjusted after the screws S' have been loosened, and the shuttle-holders Q can be shifted on the bar P to correspond with the adjustment of the bars R² after the screws Q² have been loosened. The shuttles and needles used are of the usual construction. The shuttles and needles can be removed and replaced very easily and rapidly.

So that the operation of the machine will be fully understood I will recapitulate. The needle-carrier is reciprocated vertically and the shuttles are reciprocated horizontally at right angles to the needle-carrier for each stitch. For each stitch the take-up arms K' are rocked once, as are also the rock-shafts B³ and E⁶. The needle-carrier and the shuttle-guide, and also the shuttle-holders, are reciprocated in horizontal planes parallel with the needle-carrier. During the time that the needles are raised the feed-rollers T T' are rotated and the cloth or fabric moved in the direction of the arrows $a^2 a^3$, while during the time that the needles are passing down and up through the fabric the feed-rollers are locked in place by the mechanism described.

I claim—

1. In a quilting-machine, the combination, with a shuttle-guide mounted to reciprocate in the direction of its length, of a needle-carrier mounted to reciprocate vertically and horizontally in the direction of its length, the horizontal reciprocations of the needle-carrier being imparted to the same by the shuttle-guide, substantially as shown and described.

2. In a quilting-machine, the combination, with a shuttle-guide mounted to reciprocate in the direction of its length, of a standard on the same, a piece guided to reciprocate vertically in said standard, and a needle-carrier connected with said vertically-reciprocating piece, substantially as shown and described.

3. In a quilting-machine, the combination, with sleeves, of a needle-carrier mounted to slide in said sleeves in the direction of its length, a vertical piece secured to the needle-carrier, an upright guide in which said piece is mounted to reciprocate vertically, and a shuttle-guide mounted to reciprocate in the direction of its length, with which reciprocating shuttle-guide the standard in which the pieces on the ends of the needle-carrier are guided is connected, substantially as shown and described.

4. In a quilting-machine, the combination, with a shuttle-guide divided into compartments and mounted to reciprocate in the direction of its length, of shuttle-holders within the compartments, a bar below the shuttle-guide, on which bar the holders are held, mechanism for reciprocating the bar on which the shuttle-holders are fastened in a direction at right angles to its length, and mechanism for reciprocating the shuttle-guide in the direction of its length, substantially as shown and described.

5. In a quilting-machine, the combination, with a shuttle-guide divided into compartments and mounted to reciprocate in the direction of its length, of shuttle-holders within the compartments of the shuttle-guide, a bar mounted below the shuttle-guide to reciprocate in the direction of its length and in a direction at right angles to its length, and bars mounted to reciprocate at right angles to the length of the shuttle-guide, which latter bars support the bar on which the shuttle-holders are fastened, substantially as shown and described.

6. In a quilting-machine, the combination, with a shuttle-guide mounted to reciprocate in the direction of its length, of a bar below the same mounted to reciprocate in the direction of its length and transversely to its length, shuttle-holders on said bar, bars supporting the bar on which the shuttle-holders are fastened, a rocking shaft and mechanism for operating the said bars from the same, mechanism for operating the rocking shaft from the main driving-shaft of the machine, a vertically-reciprocating needle-carrier, and mechanism for operating the needle-carrier from the main driving-shaft, said needle-carrier being also mounted to reciprocate in the direction of its length, and being reciprocated in said direction of its length from the shuttle-guide, substantially as set forth.

7. In a quilting-machine, the combination, with a frame, of a rock-shaft operated from the main driving-shaft, vertically-reciprocating sleeves operated from said rock-shaft, a needle-carrier mounted in said sleeves to reciprocate in the direction of its length, a reciprocating shuttle-guide, a pin on the same, a cam-pulley having a cam-groove into which said pin passes, a ratchet and pawl for operating said cam-pulley, which ratchet and pawl are operated by suitable intermediate devices from the main driving-shaft, a standard on the shuttle-guide, and a vertically-sliding piece on the end of the needle-carrier mounted to slide in the above-mentioned standard, substantially as shown and described.

8. In a quilting-machine, the combination, with a rocking shaft, mechanism for operating said rocking shaft from the main driving-shaft, vertically-reciprocating sleeves operated from the rocking shaft, a needle-carrier mounted in said vertically-reciprocating sleeves to reciprocate in the direction of its length, a rocking shaft provided with take-up arms, link-connection for operating the take-up shaft from the vertically-reciprocating sleeves, a shuttle mounted to reciprocate in the direction of its length, a cam, ratchet-and-pawl mechanism operated from the main driving-shaft by suitable intermediate mechanism and serving to reciprocate the shuttle-guide, a standard on the needle-guide, and a vertically-sliding piece in the standards and secured to one end of the needle-carrier, substantially as shown and described.

9. In a quilting-machine, the combination, with a rock-shaft operated from the main shaft, of a vertically and longitudinally reciprocating needle-carrier, a longitudinally-reciprocating shuttle-guide, a shuttle-carrier bar which is reciprocated in the direction of its length and transversely to its length, all these parts being operated by suitable intermediate mechanism from the main shaft, a presser-foot, a rocking shaft having arms for raising the presser-foot, an arm on said rocking shaft, and a cam on the pulley of the main shaft for operating said arm, substantially as shown and described.

10. In a quilting-machine, the combination, with a vertically and longitudinally reciprocating horizontal needle-carrier, a longitudinally-reciprocating shuttle-guide and a shuttle-carrier bar which is reciprocated in the direction of its length and transversely to the same, mechanism for operating all such parts from the main shaft, a rocking take-up shaft operated from the mechanism that reciprocates the needle-carrier vertically, the arms M on said rocking take-up shaft, the levers $M^2$ on the frame of the machine, and springs for pressing the swinging ends of said levers down upon the ends of the arms M, substantially as shown and described.

11. In a quilting-machine, the combination, with the bar P, mounted to reciprocate in the direction of its length and transversely to the same, of the shuttle-guide R above said bar P, and the cross-piece $R^2$, supporting the reciprocating shuttle-bar and passing under the bar P, substantially as shown and described.

12. In a shuttle-guide for quilting-machines, the combination, with the side pieces, R', of the cross-pieces $R^2$, provided in their ends with grooves, the nuts S in said grooves, and the screws F', passed through the side pieces, R', and screwing into said nuts, thus permitting the adjusting of the cross-pieces $R^2$ a greater or less distance from each other, substantially as shown and described.

13. In a quilting-machine, the combination, with the frame of the machine, of the main driving-shaft, a rocking shaft operated by connecting-rods from the main shaft, cog-wheels on the rocking shaft, racks engaging with said cog-wheels, a shuttle-holder bar supported by said racks and reciprocated by the same transversely to the direction of its length, a shuttle-guide above said shuttle-carrier bar, a pin connected to the shuttle-guide, a pulley having a cam-groove into which said pin is passed, a cam-wheel on the rock-shaft carrying the above-mentioned cog-wheels, a rocking lever operated from the cam-wheel, a pawl on said rocking lever, a ratchet-wheel connected with the pulley having the cam-groove and operated by said pawl on the rocking lever, vertically-reciprocating sleeves operated by the rock-shaft driven from the main shaft, a needle-carrier mounted to reciprocate in said sleeves in the direction of its length, and provided with an end piece which is guided by a standard on the reciprocating shuttle-guide, substantially as shown and described.

In testimony that I claim the foregoing as my invention I have signed my name in presence of two subscribing witnesses.

JOHN MARHOEFFER.

Witnesses:
OSCAR F. GUNZ,
MARTIN PETRY.